(12) United States Patent
Akiyama et al.

(10) Patent No.: US 11,921,823 B2
(45) Date of Patent: Mar. 5, 2024

(54) IMAGE PROCESSING DEVICE AND IMAGE PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Toshitaka Akiyama, Kawasaki Kanagawa (JP); Kei Takizawa, Kawasaki Kanagawa (JP); Io Ozawa, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 148 days.

(21) Appl. No.: 17/395,373

(22) Filed: Aug. 5, 2021

(65) Prior Publication Data
US 2022/0300751 A1 Sep. 22, 2022

(30) Foreign Application Priority Data
Mar. 17, 2021 (JP) ................................. 2021-043902

(51) Int. Cl.
G06K 9/00 (2022.01)
G06F 18/22 (2023.01)
(Continued)

(52) U.S. Cl.
CPC ................ *G06F 18/22* (2023.01); *G06T 7/73* (2017.01); *G06V 10/40* (2022.01); *H04N 5/76* (2013.01)

(58) Field of Classification Search
CPC ........... G06F 18/22; G06T 7/73; G06V 10/40; H04N 5/76
See application file for complete search history.

(56) References Cited

U.S. PATENT DOCUMENTS 9,189,859 B2 * 11/2015 Vogiatis ............... H04N 13/282
11,380,012 B2 * 7/2022 Xia ........................ G01C 21/20
(Continued)

FOREIGN PATENT DOCUMENTS

| JP | 2000-285245 A | 10/2000 | |
| JP | 2012529691 A | 11/2012 | |
| WO | WO-2019205853 A1 * | 10/2019 | ......... G06F 16/2255 |

OTHER PUBLICATIONS

Road recognition in urban environment, F. Paetzold et al., Elsevier, 2000, pp. 377-387 (Year: 2000).*
(Continued)

*Primary Examiner* — Jayesh A Patel
(74) *Attorney, Agent, or Firm* — Kim & Stewart LLP

(57) ABSTRACT

According to one or more embodiments, an image processing device includes a storage device and a processor. The storage device stores a plurality of time-series images. The processor extracts one or more feature points of a first image of the time-series images, sets a search range for one or more corresponding points of the feature points in a second image of the time-series images, searches for the one or more corresponding points in the search range of the second image, if there are a plurality of corresponding points searched, associates the searched corresponding points with the feature points based on a positional relationship between the corresponding points.

12 Claims, 11 Drawing Sheets

(51) Int. Cl.
*G06T 7/73* (2017.01)
*G06V 10/40* (2022.01)
*H04N 5/76* (2006.01)

(56) References Cited

U.S. PATENT DOCUMENTS

| | | | | |
|---|---|---|---|---|
| 11,625,842 | B2* | 4/2023 | Namiki | G06T 7/97 382/294 |
| 2002/0191837 | A1* | 12/2002 | Takeda | G08G 1/166 382/104 |
| 2009/0041337 | A1* | 2/2009 | Nakano | G06V 20/588 348/E7.086 |
| 2013/0063599 | A1* | 3/2013 | Imai | B62D 15/025 348/148 |
| 2014/0133700 | A1* | 5/2014 | Seki | G06V 20/586 382/103 |
| 2015/0269451 | A1* | 9/2015 | Seki | G06T 7/55 382/104 |
| 2016/0125612 | A1* | 5/2016 | Seki | G06T 7/0002 382/106 |
| 2018/0195973 | A1* | 7/2018 | Yonekawa | G01B 11/30 |
| 2018/0247152 | A1* | 8/2018 | Sugimura | G06V 10/761 |
| 2019/0156145 | A1* | 5/2019 | Pourian | G06F 18/22 |
| 2020/0193619 | A1* | 6/2020 | Danielsson | G06T 7/248 |

OTHER PUBLICATIONS

Road-Sign Detection and Tracking, Chiung-Yao Fang et al., 2003, pp. 1329-1341 (Year: 2003).*
Active Matching, Margarita Chli et al., Springer, 2008, pp. 72-85 (Year: 2008).*
Automatic Road Centerline Extraction from Imagery Using Road GPS Data, Chuquin Cao et al., remote sensing, 2014, pp. 9014-9033 (Year: 2014).*
Raul Mur-Artal et al., ORB-SLAM2: an Open-Source SLAM System for Monocular, Stereo and RGB-D Cameras, IEEE Transaction on Robotics, 2016, 9 pages.
Jianbo Shi et al., Good Features to Track, IEEE Conference on Computer Vision and Pattern Recognition (CVPR94), Seattle, Jun. 1994, 8 pages.
Notice of Reasons for Refusal dated Jan. 9, 2024 in corresponding Japanese Patent Application No. 2021-043902, 10 pages (with Machine Translation).

* cited by examiner

IMAGE AT TIME t

IMAGE AT TIME t + 1

IMAGE AT TIME t

IMAGE AT TIME t + 1

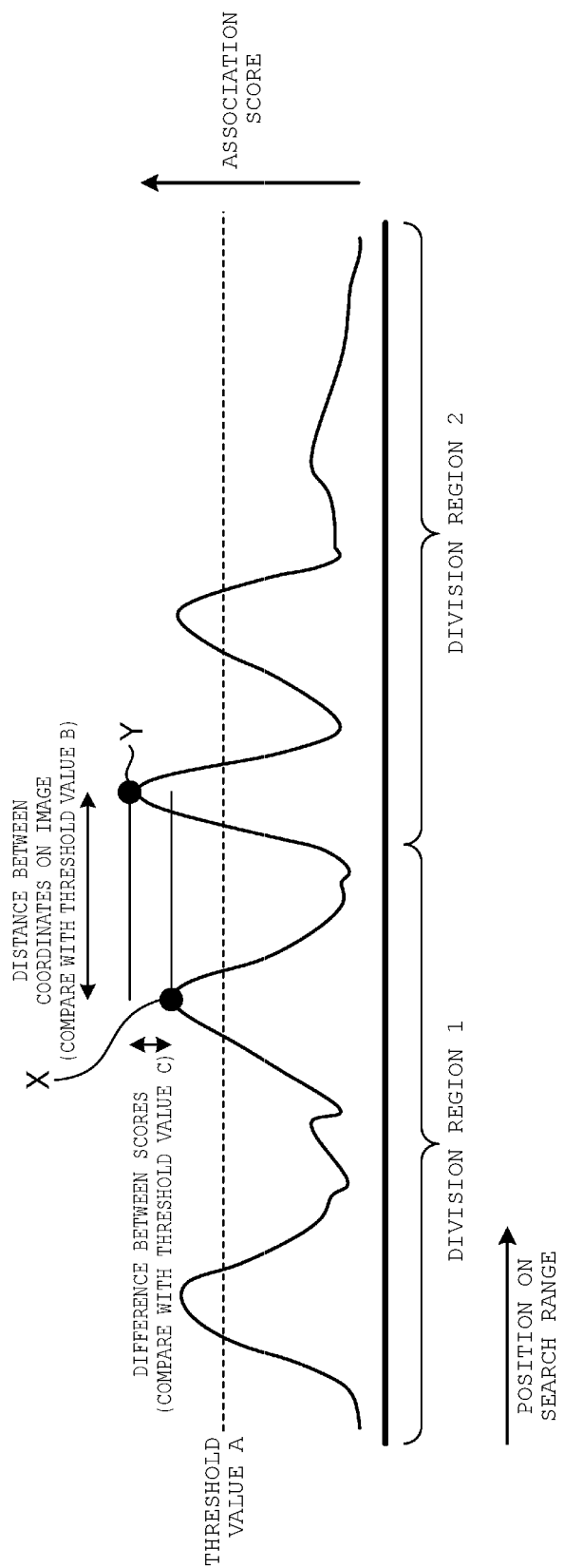

IMAGE PROCESSING DEVICE AND IMAGE PROCESSING METHOD

CROSS-REFERENCE TO RELATED APPLICATION

This application is based upon and claims the benefit of priority from Japanese Patent Application No. 2021-043902, filed Mar. 17, 2021, the entire contents of which are incorporated herein by reference.

FIELD

Embodiments described herein relate generally to an image processing device and an image processing method.

BACKGROUND

There is a technology for matching points or features within multiple images. When matching images, it is desirable to prevent an erroneous correlation between a point/feature in one image with a point/feature in another image. That is, it is desirable not to incorrectly associate points in the different images.

Hence, there is a need for a device and a method capable of preventing such erroneous association of points/features across multiple images.

BRIEF DESCRIPTION OF THE DRAWINGS

FIG. 11 is a diagram depicting an example with similar potentially corresponding coordinates.

DETAILED DESCRIPTION

According to one embodiment, an image processing device includes a storage device and a processor. The storage device stores a plurality of time-series images. The processor extracts a feature point from a first image of the time-series images and sets a search range for one or more points corresponding to the feature point in a second image of the time-series images. The processor then searches for corresponding points in the search range of the second image. If there are a plurality of points identified as potentially corresponding to the feature point in the search, the processor associates the one of the points in the plurality of potentially corresponding points to the feature point based on positional relationships between the potentially corresponding points in the plurality.

Hereinafter, some example embodiments of an image processing device and method will be described with reference to the accompanying drawings.

The image processing device according to one embodiment is mounted on a moving object, for example.

Example of Moving Object

Figure 1:
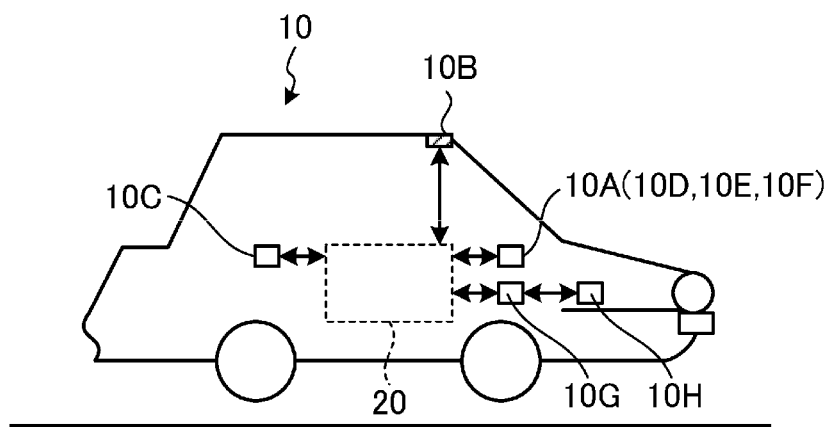
FIG. 1 is a diagram showing an example of a moving object according to an embodiment.

FIG. 1 is a diagram showing an example of a moving object 10 according to the present embodiment.

The moving object 10 includes an image processing device 20, an output unit 10A, a camera 10B, a sensor 10C, a power control unit 10G, and a power unit 10H.

The moving object 10 may be arbitrarily selected. The moving object 10 may be, for example, a vehicle, a bogie, a mobile robot, or the like. Examples of a vehicle include but are not limited to a two-wheeled vehicle, a four-wheeled vehicle, a bicycle, and a motorbike. The moving object 10 may travel by a driving operation of a person (such as a driver) or may automatically or autonomously travel without a driving operation of a person, for example.

The image processing device 20 is implemented by, for example, a dedicated or general-purpose computer. The image processing device 20 performs matching processing with feature points on an image based on a plurality of images captured in time-series by the camera 10B mounted on the moving object 10. Such images may also be referred to as time-series images. The matching processing searches points that fall in a predetermined range of coordinates of the feature points extracted in a specific image (or a first image) in a predetermined search range in a next image (or a second image) and associates the searched points of the second image with the extracted feature points of the first image. For example, the matching processing is a so-called block matching processing or the like. The image processing device 20 may be implemented by a server device on a cloud system.

Figure 2:
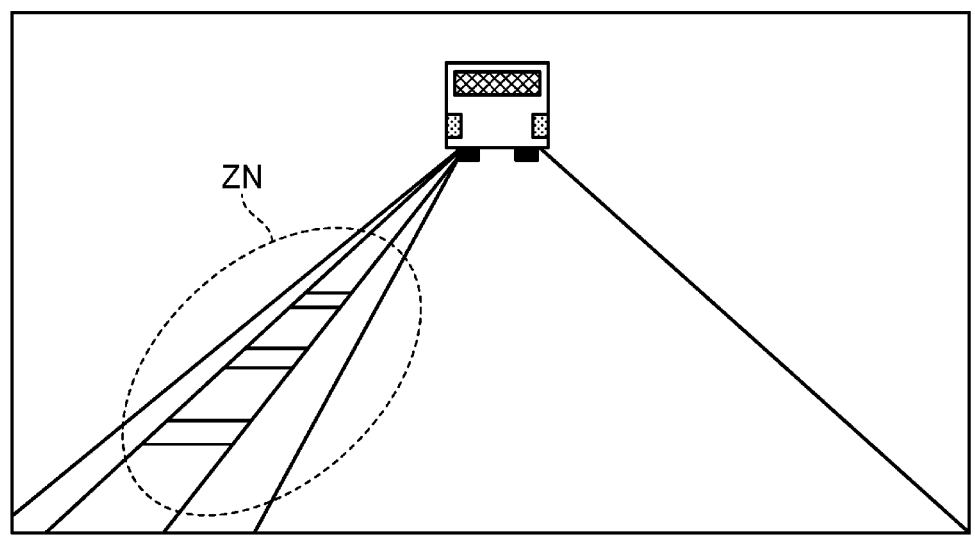
FIG. 2 shows an example of an image including a repeating pattern according to an embodiment.

FIG. 2 shows an example of an image including a repeating pattern. The image shown in FIG. 2 includes a so-called zebra zone ZN. The zebra zone ZN has three substantially parallel points that are repeating in the image, and the repeating parallel points constitute a repeating pattern. In a case where there are a plurality of feature points on the zebra zone ZN in the image as shown in FIG. 2, there is a possibility of erroneous point association between multiple images because there are points similar to the feature points at every predetermined distances. In the example of FIG. 2, if there is a guardrail next to the zebra zone ZN, pole points or the like of such a guardrail may also constitute a repeating pattern.

Figure 3:
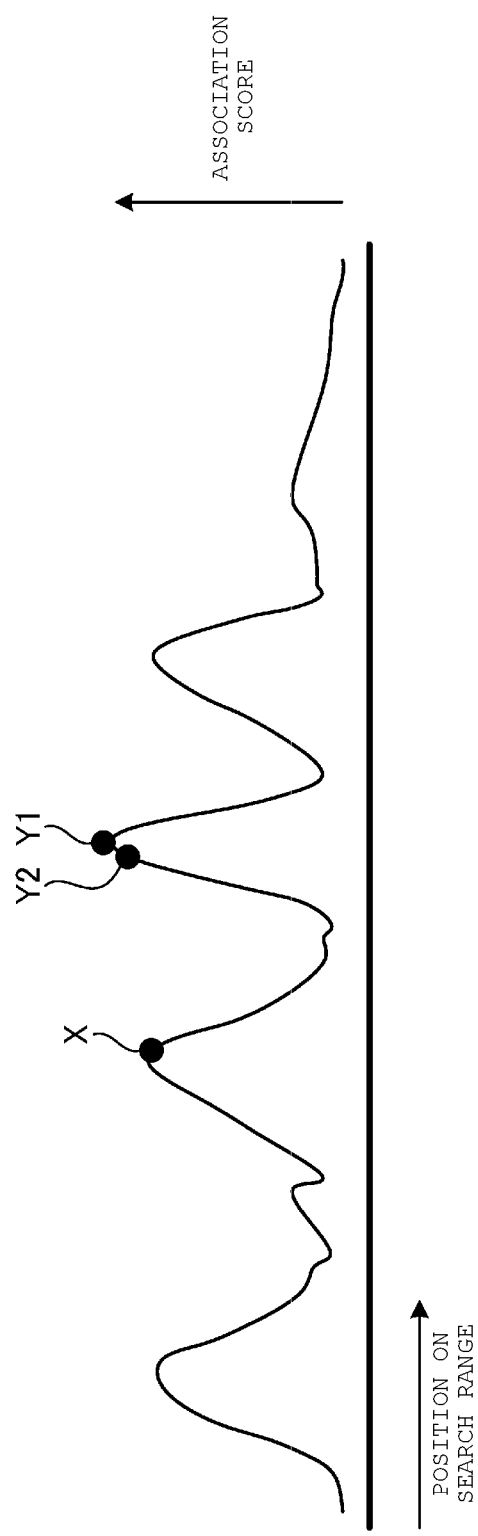
FIG. 3 is a diagram showing an example of an association score distribution according to an embodiment.

FIG. 3 shows an example of a score distribution when feature points exist in a repeating pattern and a search range also exists in a repeating pattern. Each score indicates, for example, a degree of similarity between feature points. The horizontal axis of the score distribution shown in FIG. 3 indicates a position on the search range. The vertical axis of the score distribution shown in FIG. 3 indicates the score or association score.

If there is a repeating pattern in an image, coordinates having a high degree of similarity will exist at fixed or regular intervals, and a plurality of peaks in the score distribution will exist, as shown in FIG. 3. In the present description, this property in the score distribution is referred to as a multi-peak property.

If the score distribution has a multi-peak property, there will be a plurality of points that are similar to the feature points, and therefore the point association between multiple images solely based on the respective similarity (association) scores may result in erroneous association. For example, as shown in FIG. 3, even if the point originally (and correctly identified as) corresponding to a feature point is the point X, since there are points Y1 and Y2 whose scores are slightly higher than the point X, the point Y1 will be (incorrectly) associated with the feature point by a simplistic matching based on similarity score alone.

If it is determined that there is a possibility of making erroneous association with one or more feature points due to a repeating pattern in an image, the image processing device 20 stops the association process with respect to such feature points. The "stop" as used here means that the image processing device 20 will not associate any such corresponding point to any feature point. If the image processing device 20 determines that there is no point in an image that corresponds to a feature point, such feature point is not used in association processing. In the present embodiment, the association processing is executed by a three-dimensional point group estimation unit 23 and/or an obstacle estimation unit 24 depicted in an example configuration of the image processing device 20 in FIG. 4.

Returning to FIG. 1, the power unit 10H is a drive device mounted on the moving object 10. The power unit 10H is, for example, an engine, a motor, wheels, or the like.

The power control unit 10G controls the power unit 10H. The power unit 10H is driven under control by the power control unit 10G.

The output unit 10A outputs information. In the present embodiment, the output unit 10A outputs information indicating one or more results of image matching and/or point association performed by the image processing device 20.

The output unit 10A has, for example, a communication function for transmitting the processing result of the image processing device 20, a display function for displaying the processing result of the image processing device 20, and a sound output function for outputting a sound indicating the processing result of the image processing device 20. The output unit 10A may include, for example, at least one of a communication unit 10D, a display 10E, and a speaker 10F. In the present embodiment, as one example, the output unit 10A includes all of the communication unit 10D, the display 10E, and the speaker 10F.

The communication unit 10D transmits the processing result of the image processing device 20 to another device. For example, the communication unit 10D transmits the processing result of the image processing device 20 to another device via a communication line. The display 10E displays the processing result of the image processing device 20. The display 10E is, for example, a liquid crystal display (LCD), a projection device, a light, or the like. The speaker 10F outputs a sound indicating the processing result of the image processing device 20.

The camera 10B is, for example, a monocular camera, a stereo camera, a fisheye camera, an infrared camera, or the like. The number of cameras 10B may be arbitrarily selected. The image to be captured may be a color image composed of three channels of RGB or a monochrome image of one channel expressed in gray scale. The camera 10B captures time-series images around the moving object 10. The camera 10B captures time-series images by, for example, capturing periphery of the moving object 10 in a time-series manner. The periphery of the moving object 10 is, for example, a region within a predetermined range from the moving object 10. This range is, for example, set such that the camera 10B can capture an image.

In the present embodiment, the camera 10B is installed so that a capture direction includes a front direction of the moving object 10. Thus, the camera 10B captures a front area of the moving object 10 in a time-series manner.

The sensor 10C is a sensor that measures measurement information. The measurement information includes, for example, a velocity of the moving object 10 and a steering angle of a handle of the moving object 10. The sensor 10C is, for example, an inertial measurement unit (IMU), a velocity sensor, a steering angle sensor, or the like. The IMU measures measurement information including triaxial acceleration and triaxial angular velocity of the moving object 10. The velocity sensor measures the velocity from an amount of rotation of a tire. The steering angle sensor measures the steering angle of the handle of the moving object 10.

Example of Configuration of Moving Object

Figure 4:
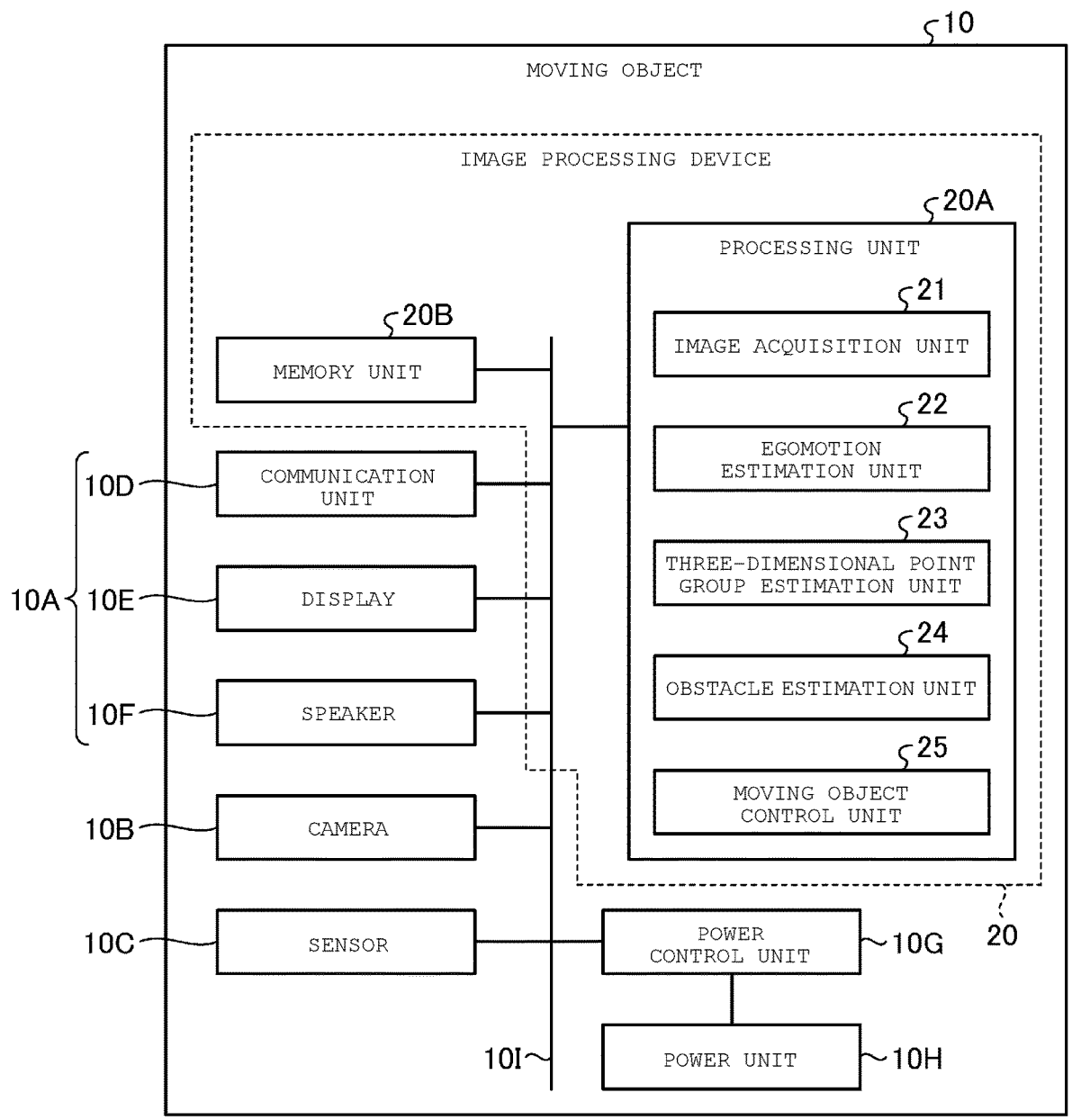
FIG. 4 is a diagram showing an example configuration of a moving object according to an embodiment.

FIG. 4 is a diagram showing an example configuration of the moving object 10 of the present embodiment.

The diagram of FIG. 4 shows the configuration in and among the image processing device 20, the output unit 10A, the camera 10B, the sensor 10C, the power control unit 10G, and a power unit 10H. The image processing device 20 includes a processing unit 20A and a memory unit 20B. The output unit 10A includes the communication unit 10D, the display 10E, and the speaker 10F.

The processing unit 20A, the memory unit 20B, the output unit 10A, the camera 10B, the sensor 10C, and the power control unit 10G are connected with one another via a bus 10I. The power unit 10H is connected to the power control unit 10G.

The output unit 10A (including the communication unit 10D, the display 10E, and the speaker 10F), the camera 10B, the sensor 10C, the power control unit 10G, and the memory unit 20B may be connected with one another via a network. The network for such connection may use a wired communication method or a wireless communication method. The network for the connection may be implemented by combining a wired system and a wireless system.

The memory unit 20B stores information. The memory unit 20B is, for example, a semiconductor memory element, a hard disk, an optical disk, or the like. The semiconductor memory element is, for example, a random-access memory (RAM), a flash memory, or the like. The memory unit 20B may be a storage device provided outside the image processing device 20. The memory unit 20B may be a storage medium. For example, the storage medium may be a medium that downloads and stores or temporarily stores one or more programs and various pieces of information via a local area network (LAN), the Internet, and the like. The memory unit 20B may include a plurality of storage media.

The processing unit 20A includes an image acquisition unit 21, an egomotion estimation unit 22, a three-dimensional point group estimation unit 23, an obstacle estimation unit 24, and a moving object control unit 25. The image acquisition unit 21, the egomotion estimation unit 22, the three-dimensional point group estimation unit 23, the obstacle estimation unit 24, and the moving object control unit 25 are implemented by, for example, one or more processors.

The processing unit 20A may be implemented by causing a processor, such as a central processing unit (CPU), to execute one or more programs, or by software. Alternatively, for example, the processing unit 20A may be implemented by a processor, such as a dedicated integrated circuit (IC), or by hardware. Further alternatively, for example, the processing unit 20A may be implemented by using software and hardware in combination.

Examples of the processor in the present embodiment include, but are not limited to, a CPU, a graphical processing unit (GPU), an application specific integrated circuit (ASIC), and a programmable logic device. Examples of the programmable logic device includes, but are not limited to, a simple programmable logic device (SPLD), a complex programmable logic device (CPLD), and a field programmable gate array (FPGA).

The processor reads and executes the program (or programs) stored in the memory unit 20B to implement the processing unit 20A. Instead of storing the program in the memory unit 20B, the program may be directly incorporated in the circuit of the processor. In the latter case, the processor implements the processing unit 20A by reading and executing the program incorporated in the circuit.

The image acquisition unit 21 acquires an image captured by the camera 10B. The image acquisition unit 21 is an example of an acquisition unit.

The egomotion estimation unit 22 acquires time-series images captured by the camera 10B and estimates egomotion information, which relates to movement of the moving object 10, based on the time-series images. As one example, the egomotion estimation unit 22 may estimate egomotion information based on the time-series images by utilizing a known technique, such as the one described in the following document:

R. Mur-Artal and J. D. Tardos, "ORB-SLAM2: an Open-Source SLAM System for Monocular, Stereo and RGB-D Cameras", arXiv preprint arXiv:1610.06475, 2016.

The egomotion estimation unit 22 estimates, for example, the egomotion information between an image at time t (or a first image) and an image at time t+1 (or a second image) of the time-series images. The image at time t+1 is an image captured at the timing next to time t.

The three-dimensional point group estimation unit 23 acquires the time-series images captured by the camera 10B and the egomotion information estimated by the egomotion estimation unit 22. The three-dimensional point group estimation unit 23 matches feature points based on the acquired time-series images and egomotion information. The three-dimensional point group estimation unit 23 estimates three-dimensional coordinates of the feature points (which constitute a three-dimensional point group) based on feature point coordinates of the image at time t (first image), the corresponding coordinates of the image at time t+1 (second image), and the egomotion information.

The obstacle estimation unit 24 estimates an obstacle based on the three-dimensional point group estimated by the three-dimensional point group estimation unit 23 and the egomotion information estimated by the egomotion estimation unit 22. For example, if there is a three-dimensional region having a greater spatial density of the three-dimensional point group, that is a three-dimensional region in which the three-dimensional point group is output in each of the time-series images, the obstacle estimation unit 24 estimates that an obstacle exists in the three-dimensional region.

The moving object control unit 25 controls the moving object 10 based on the obstacle estimation result of the obstacle estimation unit 24. For example, if it is determined that the moving object 10 is approaching an obstacle based on the estimation result, the moving object control unit 25 sends a control signal instructing a stop operation to the power control unit 10G.

Figure 5:
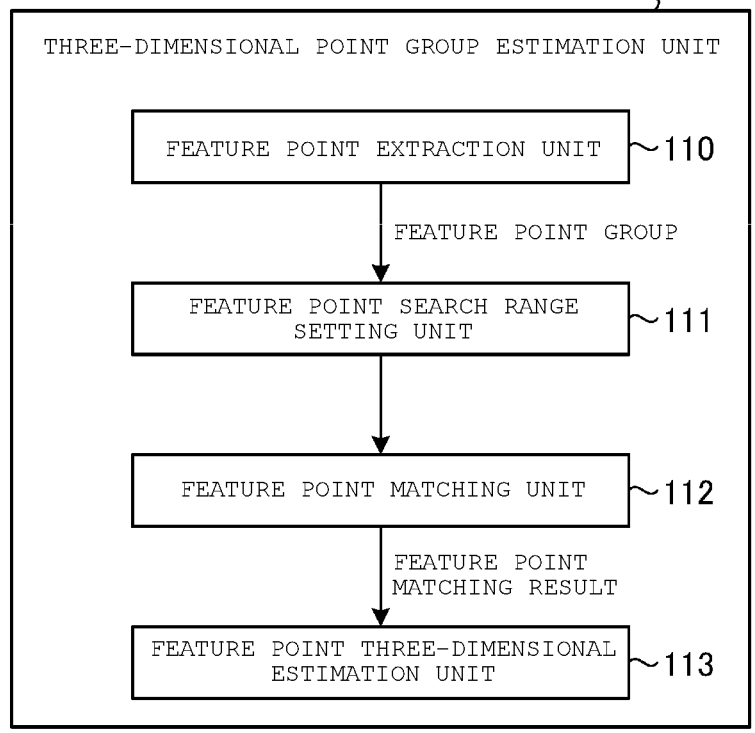
FIG. 5 is a block diagram of an example configuration of a three-dimensional point group estimation unit according to an embodiment.

FIG. 5 is a block diagram of an example configuration of the three-dimensional point group estimation unit 23.

The three-dimensional point group estimation unit 23 includes a feature point extraction unit 110, a feature point search range setting unit 111, a feature point matching unit 112, and a feature point three-dimensional estimation unit 113.

The feature point extraction unit 110 extracts one or more feature points to be used for performing three-dimensional estimation from the time-series images captured by the camera 10B. The feature point extraction unit 110 is an example of an extraction unit. As one example, the feature point extraction unit 110 may extract one or more feature points for performing three-dimensional estimation from time-series images by utilizing a known technique, such as the one described in the following document:

J. Shi J. & C. Tomasi, "Good Features to Track", IEEE Conference on Computer Vision and Pattern Recognition (CVPR'94). pp.593-600, 1994.

The feature point search range setting unit 111 acquires, from the feature point extraction unit 110, coordinates of each of the extracted feature points of the image at time t and the egomotion information between the image at time t and the image at time t+1 and determines a feature point search line in the image at time t+1. The feature point search range setting unit 111 is an example of a search range setting unit. As one example, the feature point search range setting unit 111 may set, as the feature point search line, an epipolar line at time t+1 with respect to the feature points at time t as described in the following document:

Kanaya, Sugaya, Kanazawa, "3D Computer Vision Calculation Handbook", Morikita Publishing, 2016.

Figure 6A:
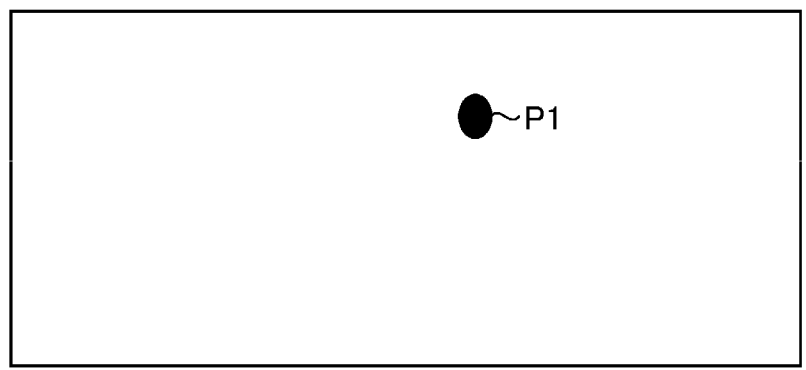
FIG. 6A is a diagram showing an example position of a feature point on an image.
Figure 6B:
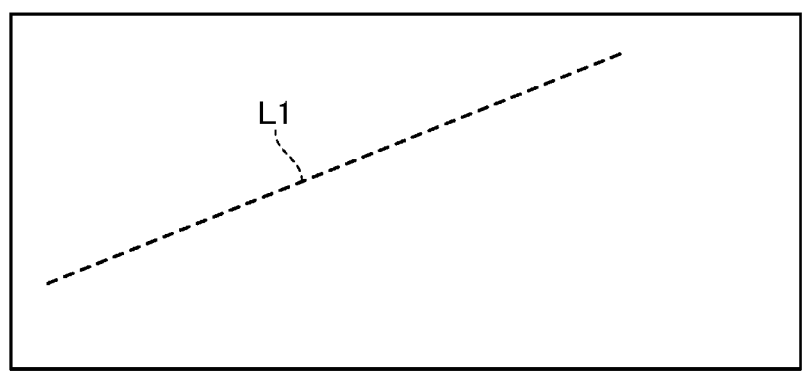
FIG. 6B is a diagram depicting an example of a feature point search range on an image.

FIG. 6A is a diagram showing an example position of one feature point on the image at time t (first image), and FIG. 6B is a diagram showing an example of the feature point search range on the image at time t+1 (second image). If the first image has a feature point P1 at the position as shown in FIG. 6A, the feature point search range setting unit 111 determines and sets a search line L1 for a corresponding point or a corresponding coordinate to the feature point P1 to the feature point P1 in the second image as shown in FIG. 6B based on the egomotion information between time t and time t+1 and the feature point P1.

Returning to FIG. 5, the feature point matching unit 112 performs matching processing between the feature points in the image at time t and corresponding coordinates of the feature points in the image at time t+1.

The feature point three-dimensional estimation unit 113 estimates the three-dimensional coordinates of the feature points based on the feature point coordinates of the image at time t (extracted by the feature point extraction unit 110), the corresponding coordinates of the image at time t+1 (obtained by the feature point matching unit 112), and the egomotion information (estimated by the egomotion estimation unit 22). A known technique may be utilized for the estimation of the three-dimensional coordinates of the feature points.

Figure 7:
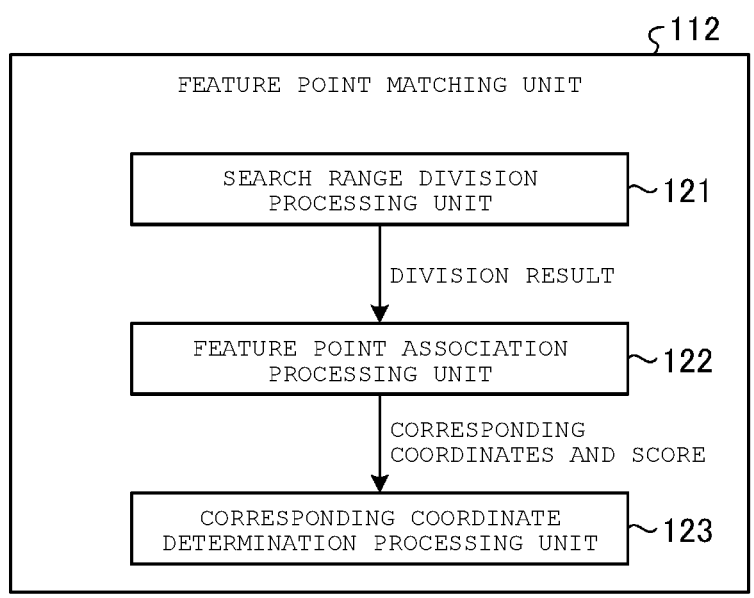
FIG. 7 is a block diagram of an example configuration of a feature point matching unit according to an embodiment.

FIG. 7 is a block diagram of an example configuration of the feature point matching unit 112.

The feature point matching unit 112 includes a search range division processing unit 121, a feature point association processing unit 122, and a corresponding coordinate determination processing unit 123.

The search range division processing unit 121 divides a feature point search range, such as the feature point search line determined by the feature point search range setting unit 111, into a plurality of regions or areas (may also be referred to as division ranges).

Based on the image at time t (first image), the feature point coordinates at time t, the image at time t+1 (second image), and the feature point search range or line in the second image, the feature point association processing unit 122 executes the point association processing between the first and second images for each division range and extracts from the second image one or more corresponding coordinates each having a higher score. The score indicates the degree of similarity with the feature points, and the higher the similarity degree is, the higher the score is. The feature point association processing unit 122 is an example of a search unit. The feature point association processing unit 122 extracts the corresponding coordinates whose scores are equal to or greater than a threshold value A, which is a predetermined threshold. The feature point association processing unit 122 may extract the corresponding coordinates each having a higher score than the threshold value A in the entire feature point search line. A known technique may be applied to score calculation.

The corresponding coordinate determination processing unit 123 determines whether to further proceed with point-to-coordinate (or point-to-point) association between the two images. The corresponding coordinate determination processing unit 123 is an example of a matching unit. In the case where a plurality of (that is two or more) corresponding coordinates (or coordinates corresponding to the feature points) have been extracted from the second image by the feature point association processing unit 122, the corresponding coordinate determination processing unit 123 selects a pair of corresponding coordinates among the extracted corresponding coordinates and determines presence or absence of a multi-peak property of the score distribution based both on a difference between or a ratio of the scores of the respective corresponding coordinates in the pair and on a distance of the respective image positions. If it is determined that the multi-peak property is present in the score distribution, the corresponding coordinate determination processing unit 123 stops the association processing (or matching processing) between the feature points and the corresponding coordinates. If the corresponding coordinate determination processing unit 123 determines that there is no multi-peak property, the corresponding coordinate having the highest score among the plurality of corresponding coordinates is matched with the feature point.

Figure 8:
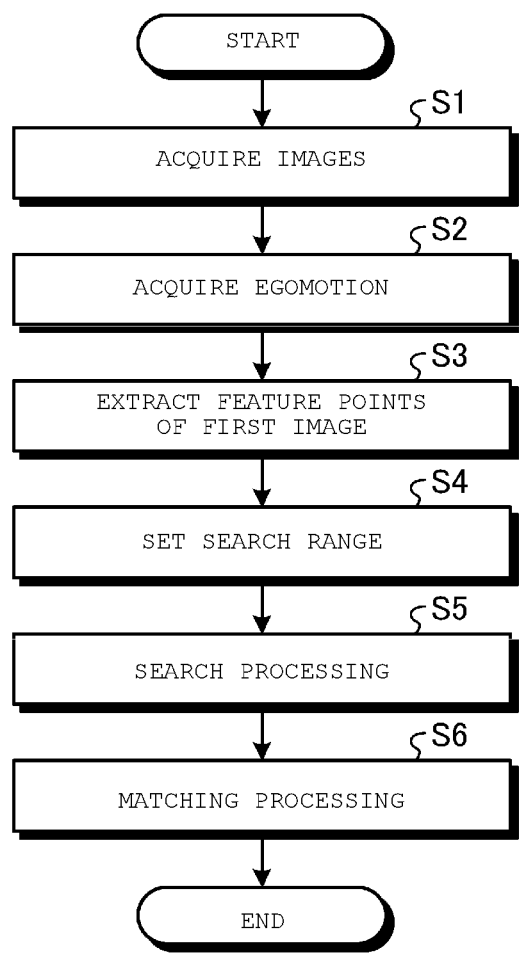
FIG. 8 is a flowchart of an image processing method according to an embodiment.

FIG. 8 is a flowchart showing overall processing of an image processing method by the image processing device 20.

First, the image acquisition unit 21 acquires time-series images by at least one camera 10B (step S1). Subsequently, the egomotion estimation unit 22 acquires the time-series images captured by the camera 10B and estimates egomotion information from the time-series images (step S2).

Then, the feature point extraction unit 110 of the three-dimensional point group estimation unit 23 extracts one or more feature points, which are to be used for three-dimensional estimation, from the time-series images (step S3).

The feature point search range setting unit 111 of the three-dimensional point group estimation unit 23 acquires feature point coordinates (or coordinates of the extracted feature points) in the image at time t (first image) of the time-series images and the estimated egomotion information between time t and time t+1 and determines a feature point search line in the image at time t+1 (second image) of the time-series images (step S4).

The search range division processing unit 121 of the feature point matching unit 112 of the three-dimensional point group estimation unit 23 divides the determined feature point search line into multiple ranges (division ranges). Then, the feature point association processing unit 122 of the feature point matching unit 112 executes the feature point association processing for each division range of the feature point search line and extracts from the second image one or more corresponding coordinates each having a higher score indicating a higher degree of similarity with the feature points (step S5).

Lastly, the corresponding coordinate determination processing unit 123 of the feature point matching unit 112 performs matching processing by associating the feature points with the corresponding coordinates or vice versa (step S6).

Figure 9:
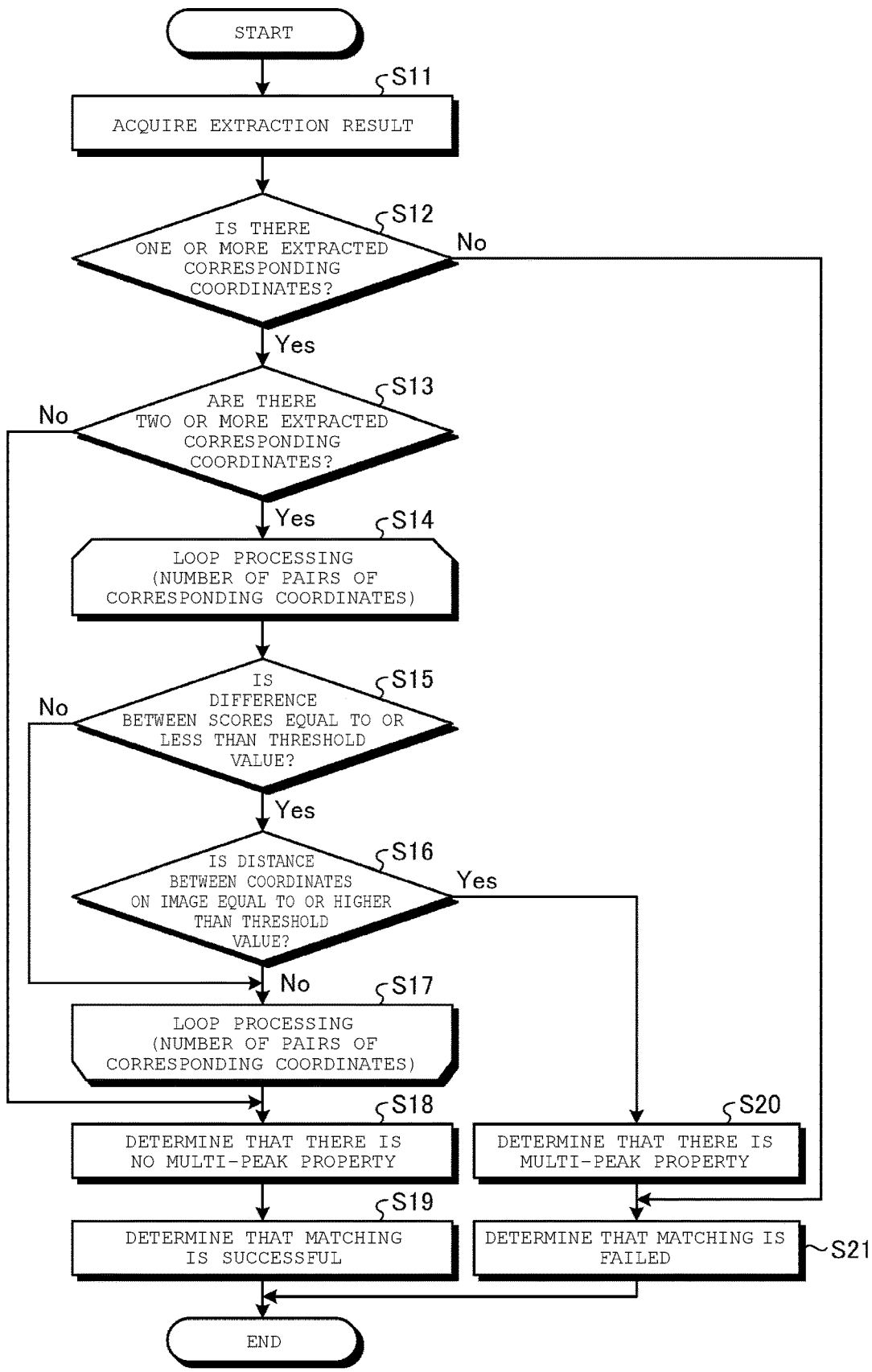
FIG. 9 is a flowchart of a procedure for associating feature points to corresponding coordinates.

As further details of the matching processing of step S6 of FIG. 8, FIG. 9 shows a flowchart of a procedure for association between the feature points extracted from the first image at time t and the corresponding coordinates extracted from the second image at time t+1 of the time-series images.

The corresponding coordinate determination processing unit 123 acquires the extraction result from the feature point association processing unit 122, the extraction result including, if any, the corresponding coordinates and their scores (step S11).

If there is not a single corresponding coordinate in the extraction result (step S12: No), the corresponding coordinate determination processing unit 123 determines that the matching has failed because there is no corresponding coordinate to be matched (step S21) and ends the matching processing.

If there is at least one corresponding coordinate in the extraction result (step S12: Yes), the corresponding coordinate determination processing unit 123 determines whether there are two or more corresponding coordinates in the extraction result (step S13). If the extraction result does not include two or more corresponding coordinates (step S13: No), the corresponding coordinate determination processing unit 123 determines that there is only one corresponding coordinate and hence there is no multi-peak property in the score distribution (step S18) and that the matching is successful (step S19), and ends the matching processing.

If there are two or more corresponding coordinates in the extraction result (step S13:Yes), the corresponding coordinate determination processing unit 123 generates at least one pair of corresponding coordinates and determines whether a difference between the scores of the paired corresponding coordinates is equal to or less than a threshold value C, which is a predetermined threshold (step S15). Such determination indicates that the scores of the paired corresponding coordinates are close to each other. If the score difference is greater than the threshold value C (step S15: No), the corresponding coordinate determination processing unit 123 proceeds to step S17 and determines whether loop processing of all the corresponding coordinate pairs has been executed. If the loop processing is not complete, the corresponding coordinate determination processing unit 123 loops back to step S14.

If the score difference scores is equal to or less than the threshold value C (step S15: Yes), the corresponding coordinate determination processing unit 123 calculates a distance between the paired corresponding coordinates on the second image and compares it with a threshold value B, which is a predetermined threshold (step S16). If it is determined that the distance is less than the threshold value B (step S16: No), the corresponding coordinate determination processing unit 123 proceeds to step S17 and determines whether the loop processing of all pairs of corresponding coordinates has been executed, and if the loop processing is complete, loops back to step S14.

If the coordinate distance is equal to or greater than the threshold value B (step S16: Yes), the corresponding coordinate determination processing unit 123 determines that there is a multi-peak property in the score distribution (step S20). Since there is a possibility of erroneous matching due to the multi-peak property, the corresponding coordinate determination processing unit 123 determines that matching has failed (step S21) and ends the matching processing (END in FIG. 9 or step S6 of FIG. 8).

If the loop processing of all the corresponding coordinate pairs has been executed (step S17), the corresponding coordinate determination processing unit 123 determines that there is no multi-peak property (step S18) since there are not more than one corresponding coordinates that are far apart from each other at a distance equal to or greater than the predetermined threshold value and that have a score value close to each other. Then, the corresponding coordinate determination processing unit 123 matches the corresponding coordinates having the highest score with the feature point (step S19) and ends the matching processing (END in FIG. 9 or step S6 of FIG. 8).

With respect to the process of setting the feature point search range, in the present embodiment, the feature point search range setting unit 111 determines the feature point search line. The present disclosure is, however, not limited to the linear search range. A predetermined region or area may be set as the feature point search range.

Figure 10A:
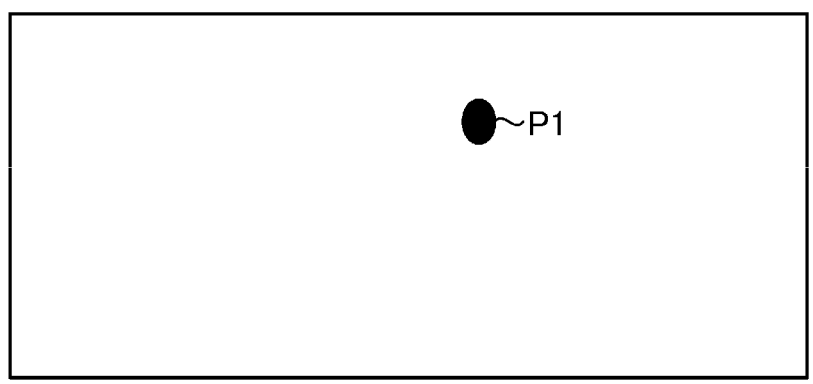
FIG. 10A is a diagram showing an example position of a feature point on an image.
Figure 10B:
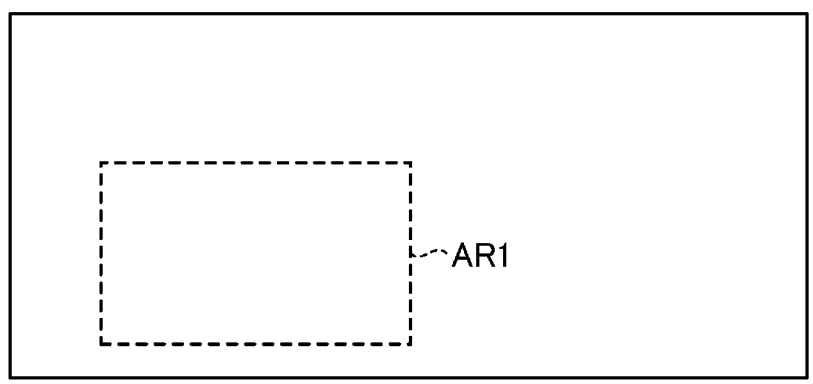
FIG. 10B is a diagram showing an example of a feature point search range on an image.

FIGS. 10A and 10B show another example of the feature point and feature point search range. If there is a feature point P1 of the image at time t (first image) of the time-series images as shown in FIG. 10A, the feature point search range setting unit 111 acquires the feature point coordinates at time t and the egomotion information between the time t and the time t+1 and sets a search range (or a search area) AR1 in the image at time t+1 (second image) of the time-series images as shown in FIG. 10B.

FIG. 11 is a diagram showing an example with similar potentially corresponding coordinates on an association score distribution. The horizontal axis of the score distribution shown in FIG. 11 indicates position within the search range. The vertical axis of the score distribution shown in FIG. 11 indicates the score or association score value. As shown in FIG. 11, the image processing device 20 sets a plurality of division ranges (or regions) within the full search range and extracts coordinates whose similarity (association) score exceeds the predetermined threshold value A from within each division range. The image processing device 20 determines the difference in score between two different corresponding coordinates (point X and point Y in this example) from the different division ranges (region 1 and region 2 in this example)) and compares this difference to threshold value C. If the difference is less than the threshold value C, then the distance between the point X and the point Y is compared with threshold value B. If the distance between point X and the point Y is greater than the threshold value B, the image processing device 20 stops associating the feature points with the two different corresponding coordinates.

A small difference in score between the corresponding coordinates (point X and point Y) indicates that there are multiple corresponding coordinates that are very similar to each other. When the distance between such similar corresponding coordinates is equal to or greater than a certain value (e.g., more than threshold value B), this indicates that similar features may be scattered in a pattern of repeating feature points. Therefore, when the similar corresponding coordinates are scattered in this manner, matching based solely based on the association score may result in erroneous matching/association processing. The image processing device 20 can avoid erroneous matching/association processing simply by stopping the matching processing when the distance between the similar corresponding coordinates exceeds a certain value.

Instead of calculating the difference between the association scores for the similar corresponding coordinates, the corresponding coordinate determination processing unit 123 may calculate a ratio between the scores of the corresponding coordinates and determine whether the corresponding coordinates are indeed similar to each other based on the calculated ratio.

The feature point search range setting unit 111 may set a search range of the image at time t+1 of the time-series images based on movement of the moving object 10. Alternatively, the feature point search range setting unit 111 may set a search range of the image at time t+1 based on a target such as a sign extracted from the image at time t of the time-series image.

According to the present embodiment, the image acquisition unit 21 of the image processing device 20 acquires a plurality of images captured by the camera 10B mounted on the moving object 10. The feature point extraction unit 110 extracts one or more feature points of an image corresponding to time t (a first image). The feature point search range setting unit 111 sets a search range for searching points corresponding to the feature points in an image corresponding to the time t+1 (a second image) based on egomotion information. The feature point association processing unit 122 of the feature point matching unit 112 searches for a corresponding point from the search range of the second image. If there are a plurality of corresponding points within the search range of the second image, the corresponding coordinate determination processing unit 123 associates the corresponding points in the second image with the feature points in the first image based on the positional relationship between the corresponding points.

In the case where the image processing device 20 conducts the corresponding point search based on the feature points that exist on the repeating pattern, if there are a plurality of corresponding points far apart from each other, the matching processing might be erroneous. If the plurality of corresponding points are not far apart from each other, the image processing device 20 can make appropriate matching by associating the corresponding points with the feature points. Hence, the image processing device 20 can prevent erroneous association in image matching.

The feature point association processing unit 122 of the image processing device 20 conducts the corresponding point search for each division range of the search range.

In this way, if a plurality of feature points exist on the repeating pattern, it is possible to specify corresponding points in each of the division ranges and determine a situation where matching processing may be erroneous.

If there are a plurality of corresponding points, the corresponding coordinate determination processing unit 123 determines whether to stop associating the corresponding points with the feature points based on the distance between the corresponding points. In this way, if the matching processing is more likely to be erroneous, that is if the corresponding points are far apart from each other or are distanced from each other for a predetermined threshold, the image processing device 20 can avoid erroneous association by stopping the matching processing.

By associating the corresponding points with the feature points based also on the similarity between the corresponding points, the corresponding coordinate determination processing unit 123 can determine a case where the matching processing may be erroneous such that the corresponding points having a close similarity to the feature points are in fact far apart from each other. This way, the corresponding coordinate determination processing unit 123 can make the association between the corresponding points and the feature points more appropriately.

While in the present embodiment, the image processing device 20 is applied to a device for detecting an obstacle, the present disclosure is not limited thereto. The image processing device 20 may be applied to a device for detecting an object.

The moving object 10 on which the image processing device 20 is mounted may be a device, an apparatus, a machine, or the like other than a vehicle. For example, the image processing device 20 may be applied to a drone or robot.

While in the present embodiment, the image processing device 20 divides the search range, the search range may not necessarily be divided.

While in the present embodiment, the image processing device 20 compares a calculated similarity value to a threshold value when comparing the scores of a plurality of corresponding coordinates, in other examples, it may be unnecessary to formal calculate a similarity value or the like to compare the scores of the plurality of corresponding coordinates.

While in the present embodiment, the image processing device 20 calculates the distances to the plurality of corresponding coordinates (when there are a plurality of corresponding coordinates) and determines whether to conduct the association between the feature points and corresponding coordinates based on the calculated distance, in other examples, the image processing device 20 may determine whether the ranges to which each of the plurality of corresponding coordinates belong are different from one another and determine whether to proceed with the association between the feature points and corresponding coordinates based on the range in which the plurality of corresponding coordinates belong. For example, for a plurality of corresponding coordinates, it may be determined whether to associate feature points with corresponding coordinates based on information regarding a positional relationship between the corresponding coordinates themselves instead of their distance.

Example of Image Processing Device Configuration

Figure 12:
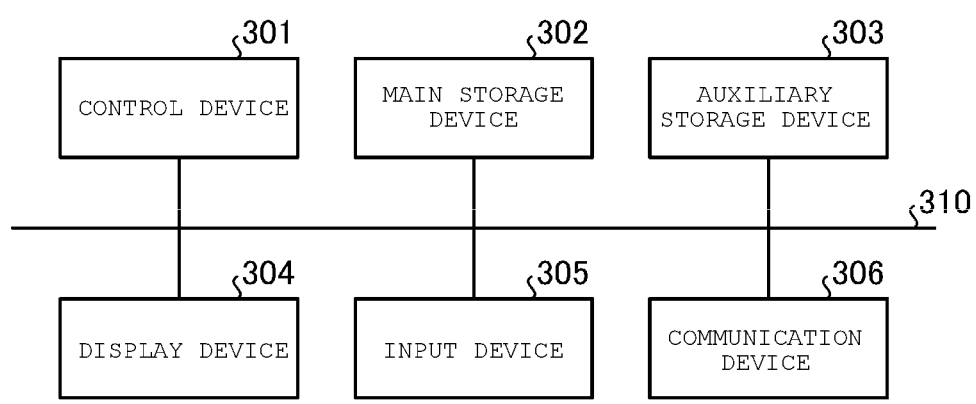
FIG. 12 is a block diagram of an example configuration of an image processing device of an embodiment.

FIG. 12 is a block diagram showing an example configuration of the image processing device 20 of the present embodiment. The image processing device 20 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected to one another via a bus 310.

The display device 304, the input device 305, and the communication device 306 may not necessarily be provided. For example, when the image processing device 20 is connected to another device, the display function, input function, and communication function of the other device may be used.

The control device 301 executes a program (or programs) read from the auxiliary storage device 303 to the main storage device 302. The control device 301 includes one or more processors, such as a CPU. The main storage device 302 is a memory, such as a read-only memory (ROM) and a RAM. The auxiliary storage device 303 is a memory card, a hard disk drive (HDD), or the like.

The display device 304 displays information. The display device 304 is, for example, a liquid crystal display. The input device 305 accepts input of information. The input device 305 is, for example, a hardware key or the like. The display device 304 and the input device 305 may be a liquid crystal touch panel or the like having both a display function and an input function. The communication device 306 communicates with another device.

The program (or programs) to be executed by the image processing device 20 may be stored in a computer-readable storage medium, such as a CD-ROM, a memory card, a CD-R and a digital versatile disc (DVD), in an installable or executable format and is provided as a computer program product.

The program to be executed by the image processing device 20 may be stored on a computer connected to a network, such as the Internet, and provided by being downloaded via the network. The program to be executed by the image processing device 20 may be provided via a network, such as the Internet, without being downloaded.

The program to be executed by the image processing device 20 may be provided by being incorporated into a ROM or the like in advance.

The program to be executed by the image processing device 20 may be a module having functions that can be implemented by the program among the functions of the image processing device 20.

The functions to be implemented by the program (or program) are loaded into the main storage device 302 when the control device 301 reads the program from a storage medium, such as the auxiliary storage device 303, and executes the program. For example, the functions to be implemented by the program are generated on the main storage device 302.

Some functions of the image processing device 20 may be implemented by hardware, such as an IC. The IC is, for example, a processor that executes dedicated processing.

When a plurality of functions are implemented by using a plurality of processors, each processor may implement one function or may implement two or more functions.

While certain embodiments have been described, these embodiments have been presented by way of example only and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image processing device for determining a motion of an object in a three-dimensional space from a plurality of time-series images captured by a camera, comprising:
a storage device configured to store the plurality of time-series images; and
a processor configured to:
(a) extract a feature point corresponding to the object in a first image of the time-series images;
(b) set a search range for a point corresponding to the feature point within a second image of the time-series images that was captured immediately after the first image;
(c) search for one or more candidates of the point corresponding to the feature point within the search range of the second image;
(d) if there is one candidate of the point identified in the search, associate said one candidate with the feature point; and
(e) if there are a plurality of candidates of the point identified in the search,
acquire a score of each of the candidates and distances between all pairs of the candidates in the second image,
if none of the distances exceeds a threshold, associate one of the candidates having a greatest score with the feature point, and
if any one of the distances exceeds the threshold, associate none of the candidates with the feature point; wherein
the processor is configured to, after performing (a)-(e) on all the time-series images:
determine three-dimensional coordinates of the object corresponding to each of the time-series images in which the candidate has been associated with the feature point, using coordinates of the candidate in said each of the time-series images, and
determine the motion of the object using the determined three-dimensional coordinates of the object.

2. The image processing device according to claim 1, wherein the processor is further configured to:
divide the search range into a plurality of division ranges; and
search for the one or more candidates of the point corresponding to the feature point in each of the division ranges.

3. The image processing device according to claim 1, wherein the time-series images are captured by the camera mounted on a vehicle.

4. The image processing device according to claim 3, wherein the processor sets the search range based on movement of the vehicle.

5. The image processing device according to claim 1, wherein the search range includes a repeating pattern.

6. An image processing method for determining a motion of an object in a three-dimensional space from a plurality of time-series images captured by a camera, the image processing method comprising:
(a) acquiring the plurality of time-series images;
(b) extracting a feature point corresponding to the object from a first image of the time-series images;
(c) setting a search range for a point corresponding to the feature point in a second image of the time-series images that was captured immediately after the first image;
(d) searching for one or more candidates of the point corresponding to the feature point within the search range in the second image;
(e) if there is one candidate of the point identified in the search, associating said one candidate with the feature point; and
(f) if there are a plurality of candidates of the point identified in the search,
acquiring a score of each of the candidates and distances between all pairs of the candidates in the second image,
if none of the distances exceeds a threshold, associating one of the candidates having a greatest score with the feature point, and
if any one of the distances exceeds the threshold, associating none of the candidates with the feature point, wherein
the image processing method further comprises, after performing (b)-(f) on all the time-series images:
determining three-dimensional coordinates of the object corresponding to each of the time-series images in which the candidate has been associated with the feature point, using coordinates of the candidate in said each of the time-series images; and
determining the motion of the object using the determined three-dimensional coordinates of the object.

7. The image processing method according to claim 6, further comprising:
dividing the search range into a plurality of division ranges; and
searching for the one or more candidates of the point corresponding to the feature point in each of the division ranges.

8. The image processing method according to claim 6, wherein the time-series images are captured by the camera mounted on a vehicle.

9. The image processing method according to claim 8, wherein the search range is set based on movement of the vehicle.

10. The image processing method according to claim 6, wherein the search range includes a repeating pattern.

11. A non-transitory computer-readable medium storing a program therein that, when executed, causes a computer to perform an image processing method for determining a motion of an object in a three-dimensional space from a plurality of time-series images captured by a camera, the image processing method comprising:
(a) acquiring the plurality of time-series images;
(b) extracting a feature point corresponding to the object from a first image of the time-series images;
(c) setting a search range for a point corresponding to the feature point in a second image of the time-series images that was captured immediately after the first image;
(d) searching for one or more candidates of the point corresponding to the feature point within the search range in the second image;
(e) if there is one candidate of the point identified in the search, associating said one candidate with the feature point; and
(f) if there are a plurality of candidates of the point identified in the search,
acquiring a score of each of the candidates and distances between all pairs of the candidates in the second image, if none of the distances exceeds a threshold, associating one of the candidates having a greatest score with the feature point, and if any one of the distances exceeds the threshold, associating none of the candidates with the feature point, wherein the image processing method further comprises, after performing (b)-(f) on all the time-series images:

determining three-dimensional coordinates of the object corresponding to each of the time-series images in which the candidate has been associated with the feature point, using coordinates of the candidate in said each of the time-series images; and determining the motion of the object using the determined three-dimensional coordinates of the object.

12. The non-transitory computer-readable medium according to claim 11, wherein the image processing method further comprises:

dividing the search range into a plurality of division ranges; and searching for the one or more candidates of the point corresponding to the feature point within each of the division ranges.

\* \* \* \* \*